US011513080B2

(12) United States Patent
Karlen

(10) Patent No.: US 11,513,080 B2
(45) Date of Patent: Nov. 29, 2022

(54) INSPECTION SYSTEMS FOR ADDITIVE MANUFACTURING SYSTEMS

(71) Applicant: Eric Karlen, Rockford, IL (US)

(72) Inventor: Eric Karlen, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 734 days.

(21) Appl. No.: 15/260,345

(22) Filed: Sep. 9, 2016

(65) Prior Publication Data
US 2018/0071999 A1    Mar. 15, 2018

(51) Int. Cl.
*B29C 64/393*    (2017.01)
*G01N 21/95*    (2006.01)
(Continued)

(52) U.S. Cl.
CPC ....... *G01N 21/9515* (2013.01); *B29C 64/393* (2017.08); *B33Y 30/00* (2014.12);
(Continued)

(58) Field of Classification Search
CPC ... B29C 64/386; B29C 64/393; B29C 64/153; B29C 64/264; B29C 64/268;
(Continued)

(56) References Cited

U.S. PATENT DOCUMENTS 2,176,999 A * 10/1939 Miller ................ C03B 23/0252
65/107
2,348,279 A * 5/1944 Boyles ............... C03B 23/0256
65/288
(Continued)

FOREIGN PATENT DOCUMENTS

WO    2007147221 A1    12/2007
WO    2016042794 A1    3/2016
WO    2017051168 A1    3/2017

OTHER PUBLICATIONS

Sapatari (V. Saptari, Fourier-Transform Spectroscopy Instrumentation Engineering, SPIE Press, Bellingham, WA (2003); Chapter 5.4.1, pp. 56-58).*
(Continued)

*Primary Examiner* — Jacob T Minskey
*Assistant Examiner* — Adrien J Bernard
(74) *Attorney, Agent, or Firm* — Locke Lord LLP; Daniel J. Fiorello; Gabrielle Gelozin

(57) ABSTRACT

An inspection system for an additive manufacturing machine can include a housing configured to be mounted to an internal construction of the additive manufacturing machine, wherein the housing defines a laser inlet configured to allow a laser beam from a laser of the additive manufacturing machine to enter into the housing, wherein the housing defines a laser outlet configured to allow the laser beam to exit from the housing and to allow reflected light to enter into the housing. One or more detectors is disposed within the housing and configured to receive the reflected light. The system includes one or more optical elements configured to allow the laser beam to pass through the housing from the laser inlet to the laser outlet toward a build area of the additive manufacturing machine and to direct reflected light from the laser outlet to the one or more detectors within the housing.

13 Claims, 4 Drawing Sheets

(51) Int. Cl.
  *B33Y 50/02*    (2015.01)
  *B33Y 30/00*    (2015.01)
  *B33Y 50/00*    (2015.01)
  *G01N 21/88*    (2006.01)
  *B29K 105/00*   (2006.01)

(52) U.S. Cl.
  CPC ............. *B33Y 50/00* (2014.12); *B33Y 50/02* (2014.12); *G01N 21/8806* (2013.01); *B29K 2105/251* (2013.01); *G01N 2021/8848* (2013.01); *G01N 2201/0683* (2013.01); *G01N 2201/06113* (2013.01)

(58) Field of Classification Search
  CPC ......... B33Y 30/00; B33Y 50/00; B33Y 50/02; B22F 3/1055; B22F 2003/1056–1059
  See application file for complete search history.

(56) References Cited

U.S. PATENT DOCUMENTS

| | | | | |
|---|---|---|---|---|
| 3,241,936 | A * | 3/1966 | Leflet, Jr. | C03B 23/0258 65/62 |
| 3,403,991 | A * | 10/1968 | Comperatore | C03B 23/0258 65/107 |
| 3,762,903 | A * | 10/1973 | Hamilton | C03B 23/0258 65/107 |
| 3,762,904 | A * | 10/1973 | Hamilton | C03B 23/0258 65/107 |
| 3,795,501 | A * | 3/1974 | Jansson | C03B 23/0258 65/106 |
| 3,795,570 | A * | 3/1974 | Jansson et al. | B32B 17/1077 428/34 |
| 3,865,680 | A * | 2/1975 | Reese | C03B 23/0258 428/174 |
| 4,002,450 | A * | 1/1977 | Hamilton | C03B 23/0256 65/107 |
| 4,015,969 | A * | 4/1977 | Brown | C03B 23/027 65/289 |
| 4,081,263 | A * | 3/1978 | Mestre | C03B 23/0256 65/106 |
| 5,129,934 | A * | 7/1992 | Koss | C03B 23/027 65/107 |
| 5,427,733 | A * | 6/1995 | Benda | B33Y 40/00 419/1 |
| 5,530,221 | A | 6/1996 | Benda et al. | |
| 6,195,168 | B1 * | 2/2001 | De Lega | G01B 11/2441 356/497 |
| 6,775,006 | B2 * | 8/2004 | Groot | G01B 11/0608 356/497 |
| 8,809,780 | B2 | 8/2014 | Wollenhaupt et al. | |
| 8,822,875 | B2 * | 9/2014 | Webster | A61B 18/20 219/121.11 |
| 9,200,961 | B2 | 12/2015 | Angel et al. | |
| 9,676,654 | B2 * | 6/2017 | Gabel | C03B 23/0305 |
| 10,399,183 | B2 * | 9/2019 | Dallarosa | B23K 26/342 |
| 2001/0050773 | A1 * | 12/2001 | De Groot | G01B 9/0209 356/497 |
| 2003/0112444 | A1 * | 6/2003 | Yang | G01B 9/02078 356/486 |
| 2003/0227632 | A1 * | 12/2003 | Marcus | G01B 9/02007 356/497 |
| 2005/0057756 | A1 * | 3/2005 | Fang-Yen | G01B 9/0209 356/497 |
| 2005/0105097 | A1 * | 5/2005 | Fang-Yen | G01B 9/02071 356/497 |
| 2005/0200856 | A1 * | 9/2005 | Groot | G01B 11/2441 356/512 |
| 2006/0187465 | A1 * | 8/2006 | Groot | G01B 9/02039 356/512 |
| 2007/0038125 | A1 * | 2/2007 | Kleen | G01B 9/02091 600/476 |
| 2007/0238955 | A1 * | 10/2007 | Tearney | A61B 1/00167 600/407 |
| 2009/0033916 | A1 * | 2/2009 | Hsu | G01B 9/02007 356/73 |
| 2009/0206065 | A1 * | 8/2009 | Kruth | B23K 26/0665 219/121.66 |
| 2012/0138586 | A1 * | 6/2012 | Webster | B23K 15/085 219/121.64 |
| 2014/0376000 | A1 * | 12/2014 | Swanson | G01B 9/02004 356/479 |
| 2014/0376001 | A1 * | 12/2014 | Swanson | G01N 21/17 356/479 |
| 2015/0002852 | A1 * | 1/2015 | de Groot | G01B 9/02081 356/491 |
| 2015/0219444 | A1 | 8/2015 | Bamberg et al. | |
| 2015/0375456 | A1 * | 12/2015 | Cheverton | B22F 12/00 264/406 |
| 2016/0023403 | A1 * | 1/2016 | Ramos | B33Y 30/00 264/40.1 |
| 2016/0039045 | A1 * | 2/2016 | Webster | B23K 26/0648 356/496 |
| 2016/0185048 | A1 * | 6/2016 | Dave | B29C 64/386 700/119 |
| 2017/0021454 | A1 * | 1/2017 | Dallarosa | B23K 26/342 |
| 2017/0120337 | A1 * | 5/2017 | Kanko | G01B 9/02083 |
| 2017/0239892 | A1 * | 8/2017 | Buller | B23K 26/702 |
| 2017/0266727 | A1 * | 9/2017 | Nishino | B29C 64/188 |
| 2017/0341183 | A1 * | 11/2017 | Buller | B29C 64/153 |
| 2017/0355018 | A1 * | 12/2017 | Karlen | B22F 3/16 |
| 2018/0154442 | A1 * | 6/2018 | Milshtein | B29C 64/393 |

OTHER PUBLICATIONS

Search Report under Section 17(5), of the UK Intellectual Property Office, dated Dec. 21, 2018, issued in corresponding GB Application No. GB1714327.2.

* cited by examiner

INSPECTION SYSTEMS FOR ADDITIVE MANUFACTURING SYSTEMS

BACKGROUND

1. Field

The present disclosure relates to additive manufacturing, more specifically to quality monitoring systems in additive manufacturing.

2. Description of Related Art

Additive manufacturing processes have thus far been successful in creating monolithic structures. However, part integrity has largely relied upon the assumption that variation in the build process is understood and minimized and that any voids or porosity created in the part would be "healed" during post processing treatments.

There is a need to determine the quality of the material being printed utilizing a laser or other heat source to melt the material feedstock. The resultant work surface is the product of many welds and susceptible to the same defects created during a typical laser welding operation (e.g., cracks, porosity, voids, non-uniform surface, etc.) Such conventional methods and systems have generally been considered satisfactory for their intended purpose. However, there is still a need in the art for improved quality monitoring in additive manufacturing. The present disclosure provides a solution for this need.

SUMMARY

An inspection system for an additive manufacturing machine can include a housing configured to be mounted to an internal construction of the additive manufacturing machine, wherein the housing defines a laser inlet configured to allow a laser beam from a laser of the additive manufacturing machine to enter into the housing, wherein the housing defines a laser outlet configured to allow the laser beam to exit from the housing and to allow reflected light to enter into the housing. One or more detectors (e.g., photodiodes) are disposed within the housing and configured to receive the reflected light.

The system includes one or more optical elements configured to allow the laser beam to pass through the housing from the laser inlet to the laser outlet toward a build area of the additive manufacturing machine and to direct reflected light from the laser outlet to the one or more detectors within the housing. The housing can be mounted to be moveable within the additive manufacturing machine.

The one or more optical elements can include a first beam splitter disposed in the housing in optical communication with laser inlet and the laser outlet, the beam splitter configured to pass a laser beam to a build area of the additive manufacturing machine and to direct the reflected light to the one or more detectors. The first beam splitter can be configured to split the laser beam from the laser into a reference beam and an interrogation beam, further comprising a mirror configured to reflect the reference beam to the one or more detectors.

The one or more detectors can include a plurality of detectors disposed within the housing. The system can further include a second beam splitter configured to split the reflected light to direct the reflected light to each of the plurality of detectors. The second beam splitter can be polarizing.

In certain embodiments, the system can include a polarizer disposed in the laser inlet upstream of the beam splitter. The polarizer can be a linear polarizer and/or any other suitable polarizer.

The system can include a waveplate disposed downstream of the polarizer. The waveplate can be a quarter-waveplate.

A method of inspecting an article being additively manufactured can include using a laser beam of an additive manufacturing machine for inspection within the additive manufacturing machine. The method can include redirecting a first portion of light emitted from a laser, the laser being configured to heat material during an additive manufacturing operation, toward at least one detector, redirecting a second portion of light from the laser, after having reflected off an article being additively manufactured during the additive manufacturing operation, toward the at least one detector, and analyzing the first portion of light and the second portion of light impinging the at least one detector for characteristics associated with a surface of the article.

In certain embodiments, an inspection arrangement for an additive manufacturing system can include at least one detector configured to analyze light received thereby, and optic elements configured to direct a first portion of light from a laser, the laser being configured to heat material during an additive manufacturing process, toward the at least one detector, and further being configured to direct a second portion of the light from the laser, after having reflected off an article being additively manufactured, toward the at least one detector. These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
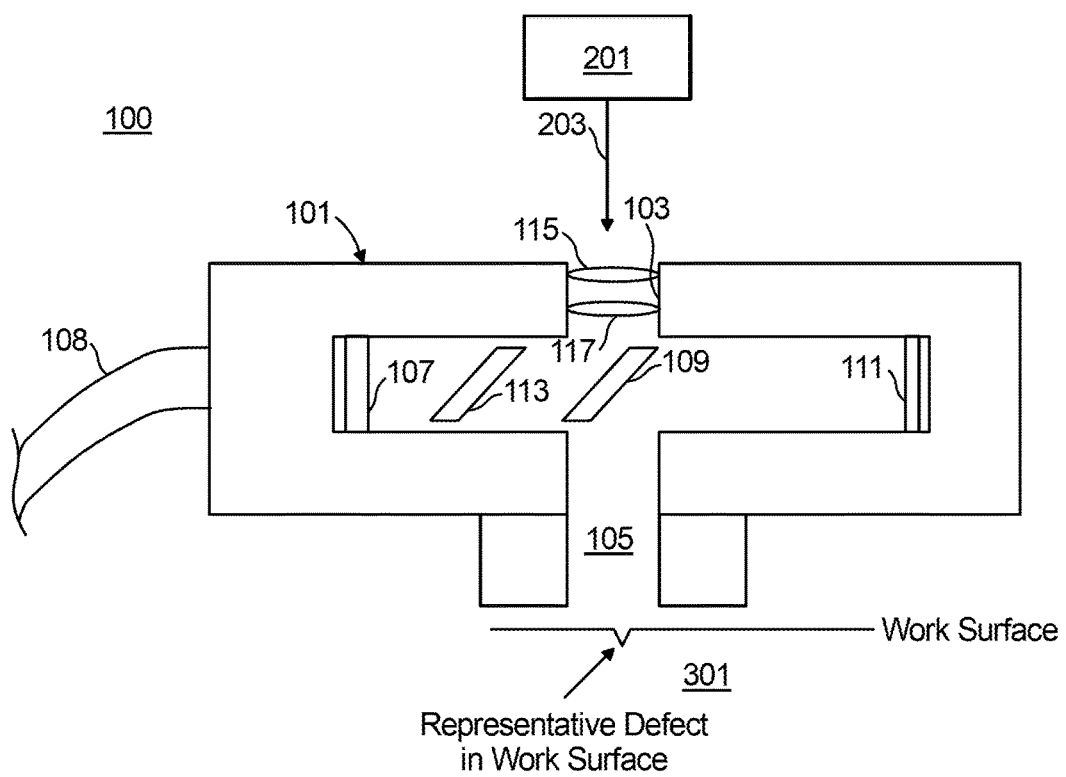
FIG. 1 is a cross-sectional view of an embodiment of a system in accordance with this disclosure.
Figure 2:
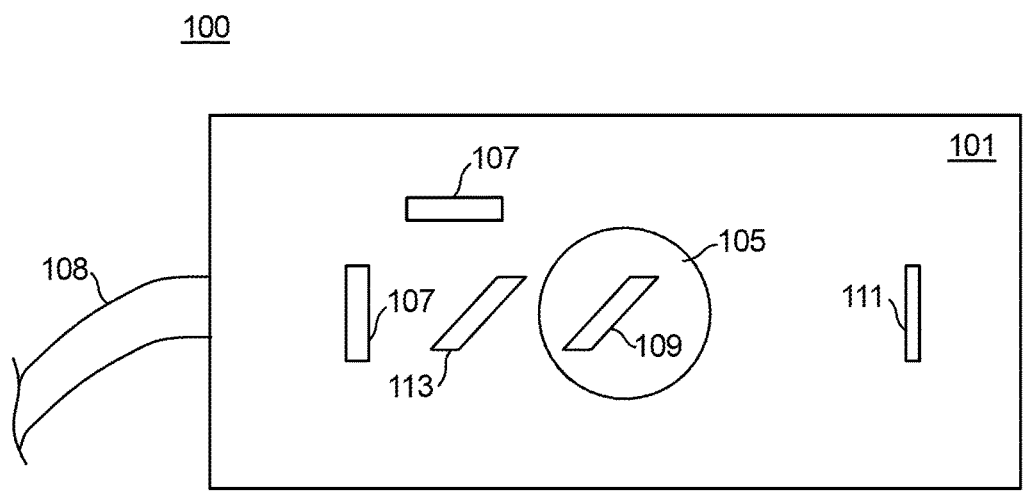
FIG. 2 is a cross-sectional plan view of the system of FIG. 1.
Figure 3:
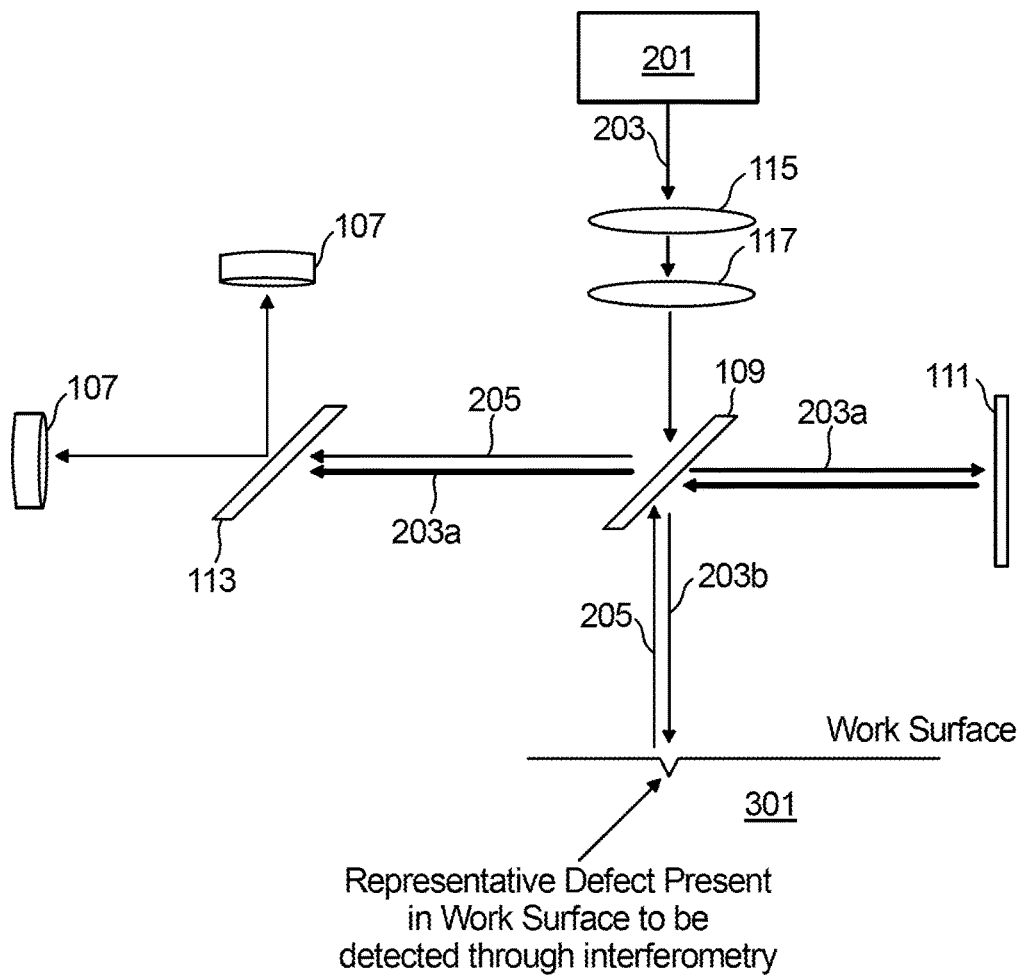
FIG. 3 is a schematic view of the embodiment of FIG. 1, shown disposed over a work surface during inspection having a laser beam applied to the system.
Figure 4:
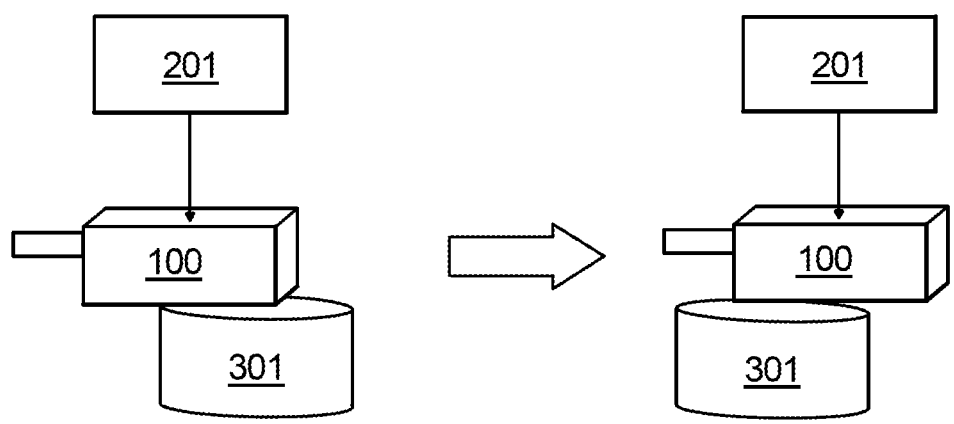
FIG. 4 is a schematic diagram showing the system of FIG. 1 moving relative to a work surface during inspection.

Reference will now be made to the drawings wherein like reference numerals identify similar structural features or aspects of the subject disclosure. For purposes of explanation and illustration, and not limitation, an illustrative view of an embodiment of an inspection system in accordance with the disclosure is shown in FIG. 1 and is designated generally by reference character 100. Other embodiments and/or aspects of this disclosure are shown in FIGS. 2-4. The systems and methods described herein can be used to perform inspection (e.g., interferometry) in an additive manufacturing machine using the existing laser of the additive manufacturing machine, for example.

Referring to FIGS. 1, 2, and 3, an inspection system 100 for an additive manufacturing machine (not shown) can include a housing 101 configured to be mounted to an internal construction of the additive manufacturing machine. The housing 101 defines a laser inlet 103 configured to allow a laser beam 203 from a laser 201 of the additive manufacturing machine to enter into the housing 101. The housing 101 also defines a laser outlet 105 configured to allow the laser beam 203 to exit from the housing 101 and to allow reflected light 205 to enter into the housing. One or more detectors (e.g., any suitable photodiode(s)) can be disposed within the housing and configured to receive the reflected light.

Generally, the system 100 includes one or more optical elements configured to allow the laser beam 203 to pass through the housing 101 from the laser inlet 103 to the laser outlet 105 toward a build area 301 of the additive manufacturing machine and to direct reflected light 205 from the laser outlet 105 to the one or more detectors 107 within the housing 101. The housing 101 can be mounted to be moveable within the additive manufacturing machine (e.g., to manually or automatically be moved out of the way of a recoater).

In certain embodiments, the one or more optical elements can include a first beam splitter 109 disposed in the housing 101 in optical communication with laser inlet 103 and the laser outlet 105. The beam splitter 109 can be configured to pass the laser beam 203 to the build area 301 of the additive manufacturing machine and to direct the reflected light 205 to the one or more detectors 107. The first beam splitter 109 can be configured to split the laser beam 203 from the laser 203 into a reference beam 203*a* and an interrogation beam 203*b*. The system 100 can further comprising a mirror 111 configured to reflect the reference beam 203*a* to the one or more detectors 107.

The one or more detectors 107 can include a plurality of detectors 107 disposed within the housing 107. For example, as shown, the detectors 107 can be positioned 90 degrees apart. The one or more detectors 107 can be operatively connected to a suitable signal reading device (e.g., a computer, not shown) via one or more cables 108.

The system 100 can further include a second beam splitter 113 configured to split the reflected light 205 and/or the reference beam 203*a* to direct them to each of the plurality of detectors 107. The second beam splitter 113 can be polarizing.

In certain embodiments, the system 100 can include a polarizer 115 disposed in the laser inlet 103 upstream of the first beam splitter 109. The polarizer 115 can be a linear polarizer and/or any other suitable polarizer.

The system 100 can include a waveplate 117 disposed downstream of the polarizer 115. The waveplate 117 can be a quarter-waveplate or any other suitable waveplate as desired (e.g., half-wave).

The optical components as described above are merely an example of optical components that can be used. The optical components can include any suitable material(s) as appreciated by those having ordinary skill in the art, to perform their function. Any other suitable components and/or organization thereof is contemplated herein to permit the laser of an additive manufacturing system usable as an inspection laser source.

In accordance with at least one aspect of this disclosure, a method can include using a laser beam of an additive manufacturing machine for inspection within the additive manufacturing machine. The method can include reducing a power of an additive manufacturing laser to a suitable level for inspection (e.g., interferometry). The method can include increasing the power after inspection to a suitable level for using the laser for sintering.

No interferometry systems or the like have been implemented within an existing additive manufacturing system. Any effort to introduce the capability will incorporate a light or laser source within an existing or third party interferometry system. There is limited space for third party systems to allow incorporation into the existing powder bed systems, for example, so it is difficult or impossible to use existing interferometry systems in many cases. Also, interferometers need to be able to move with system as it printing, but are currently too bulky.

Embodiments utilize the laser within an additive manufacturing system as the source, rather than the installation of an entire third party inspection system. In embodiments, a homodyne laser interferometry apparatus is established that utilizes the laser from a directed energy deposition system, for example. Such embodiments allow in-situ inspection of the work surface to continually and/or intermittently monitor the part integrity. If defects are generated during the build process, embodiments will allow the additive manufacturing system to go back and remove material containing the defect and rebuild that area. The ability to understand part integrity during the additive process will minimize the amount of inspection required downstream and thus improve cycle time. In situ inspection will also minimize or eliminate waste/scrap from the additive process.

The methods and systems of the present disclosure, as described above and shown in the drawings, provide for inspection systems and methods with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An additive manufacturing system, comprising:
a laser configured to emit a laser beam to a build area; and
an integrated inspection system, the inspection system including,
a housing mounted to an internal construction of the additive manufacturing machine, wherein the housing defines a laser inlet and a laser outlet configured to allow the laser beam to pass through the housing from the laser inlet to though the laser outlet and to allow reflected light to enter into the housing;
one or more detectors disposed within the housing and configured to receive the reflected light; and
one or more optical elements configured to allow the laser to pass through the housing from the laser inlet to the laser outlet toward the build area and to direct reflected light from the laser outlet to the one or more detectors within the housing, wherein the one or more optical elements include a first beam splitter disposed in the housing in optical communication with laser inlet and the laser outlet, the beam splitter configured to pass a laser beam to the build area and to direct the reflected light to the one or more detectors, wherein the first beam splitter is configured to split the laser beam from the laser into a reference beam and an interrogation beam, such that the interrogation beam passes through to the build area and the reference beam is reflected into the housing, wherein the first beam splitter is the only beam splitter between the laser inlet and the laser outlet.

2. The system of claim 1, further comprising a mirror configured to reflect the reference beam to the one or more detectors.

3. The system of claim 1, wherein the one or more detectors include a plurality of detectors disposed within the housing.

4. The system of claim 3, further comprising a second beam splitter configured to split the reflected light to direct the reflected light to each of the plurality of detectors.

5. The system of claim 4, wherein second beam splitter is polarizing.

6. The system of claim 1, further comprising a polarizer disposed in the laser inlet upstream of the beam splitter.

7. The system of claim 6, wherein polarizer is a linear polarizer.

8. The system of claim 6, further comprising a waveplate disposed downstream of the polarizer.

9. The system of claim 8, wherein the waveplate is a quarter-waveplate.

10. The system of claim 1, wherein the housing configured to be mounted to be moveable, with the one or more detectors and one or more optical elements, within an additive manufacturing machine.

11. An additive manufacturing system, comprising:
a laser configured to emit a laser beam to a build area; and
an integrated inspection arrangement, the inspection arrangement including,
  at least one detector configured to analyze light received thereby; and
  one or more optical elements configured to direct a first portion of light from the laser, the laser being configured to heat material during an additive manufacturing process, toward the at least one detector, and further being configured to direct a second portion of the light from the laser, after having reflected off an article being additively manufactured, toward the at least one detector, wherein the optical elements include a first beam splitter disposed in a housing in optical communication with laser inlet and the laser outlet, the beam splitter configured to pass the laser beam through the beam splitter to the build area and to reflect or refract the reflected light in a different direction than incident upon the beam splitter to the one or more detectors such that the reflected light does not pass through the beam splitter in a parallel direction with the laser beam, wherein the first beam splitter is configured to split the laser beam from the laser into a reference beam and an interrogation beam, such that the interrogation beam passes through to the build area and the reference beam is reflected or refracted towards the one or more detectors, wherein the first beam splitter is the only beam splitter between the laser inlet and the laser outlet.

12. An additive manufacturing system, comprising:
a laser configured to emit a laser beam to a build area; and
an inspection system, the inspection system including,
a housing moveably mounted to an internal construction of the additive manufacturing machine, wherein the housing defines a laser inlet configured to allow a laser beam from a laser of the additive manufacturing machine to enter into the housing, wherein the housing defines a laser outlet configured to allow the laser beam to exit from the housing and to allow reflected light to enter into the housing;
  one or more detectors disposed within the housing and configured to receive the reflected light; and
  one or more optical elements configured to allow the laser to pass through the housing from the laser inlet to the laser outlet toward the build area and to direct reflected light from the laser outlet to the one or more detectors within the housing, wherein the one or more optical elements include a first beam splitter disposed in the housing in optical communication with laser inlet and the laser outlet, the beam splitter configured to pass a laser beam to the build area and to direct the reflected light to the one or more detectors, wherein the first beam splitter is configured to split the laser beam from the laser into a reference beam and an interrogation beam, wherein the first beam splitter is the only beam splitter between the laser inlet and the laser outlet.

13. The system as recited in claim 12, wherein the housing defines a laser inlet configured to allow a laser beam from a laser of the additive manufacturing machine to enter into the housing perpendicular to a build area.

* * * * *